July 3, 1928.
R. GOLDSCHMIDT
1,675,800
MECHANISM FOR MEASURING THE FREQUENCY OF THE PULSE
Filed Sept. 8, 1926   5 Sheets-Sheet 1
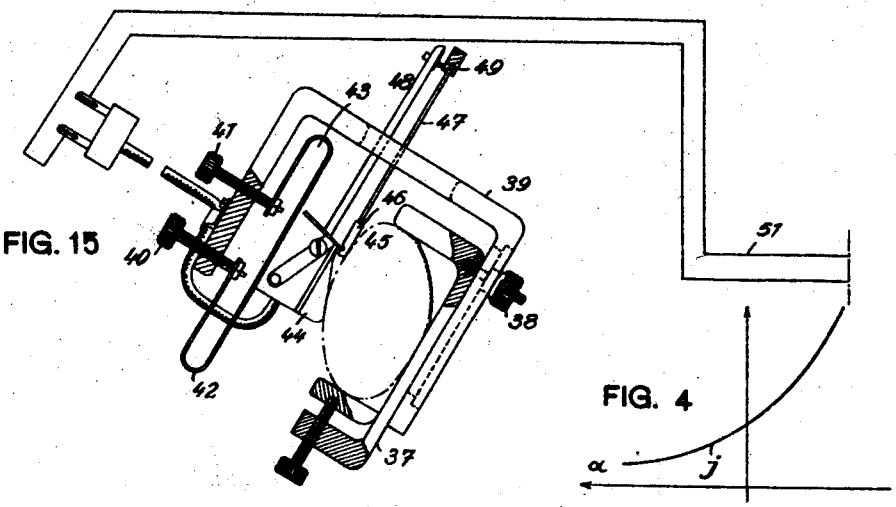
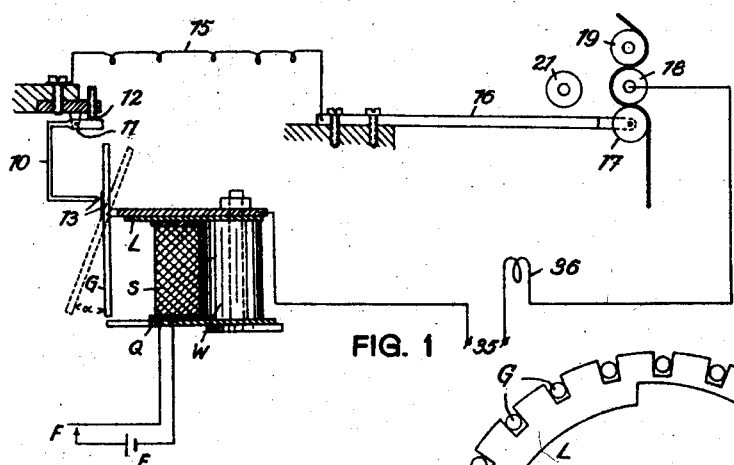
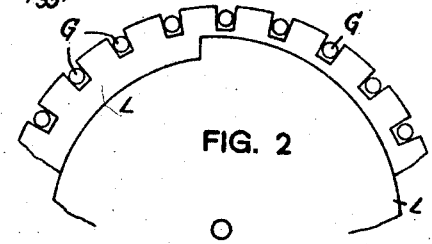
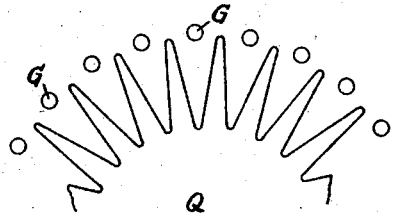
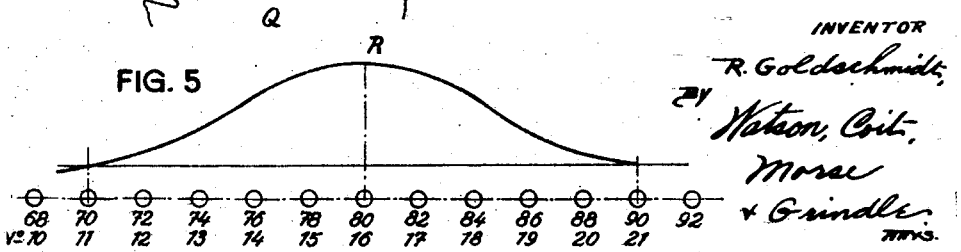
INVENTOR
R. Goldschmidt
BY Watson, Coit,
Morse
& Grindle
ATTYS.

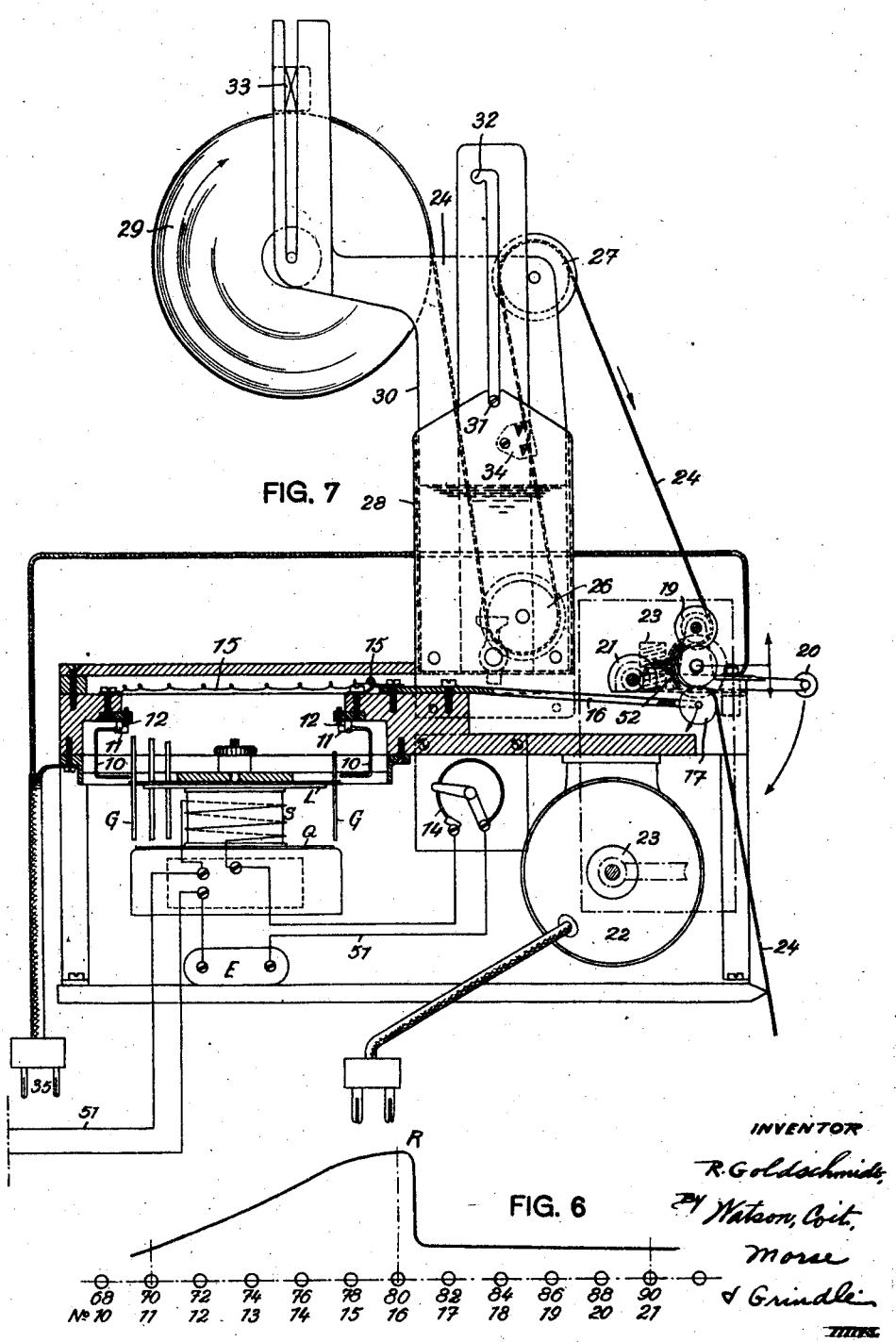

July 3, 1928.　　　　　　　　　　　　　　　　　　1,675,800
R. GOLDSCHMIDT
MECHANISM FOR MEASURING THE FREQUENCY OF THE PULSE
Filed Sept. 8, 1926　　　5 Sheets-Sheet 3

July 3, 1928.  
R. GOLDSCHMIDT  
1,675,800  
MECHANISM FOR MEASURING THE FREQUENCY OF THE PULSE  
Filed Sept. 8, 1926  5 Sheets-Sheet 4

INVENTOR  
R. Goldschmidt,  
BY Watson, Coit, Morse & Grindle,  
ATTYS.

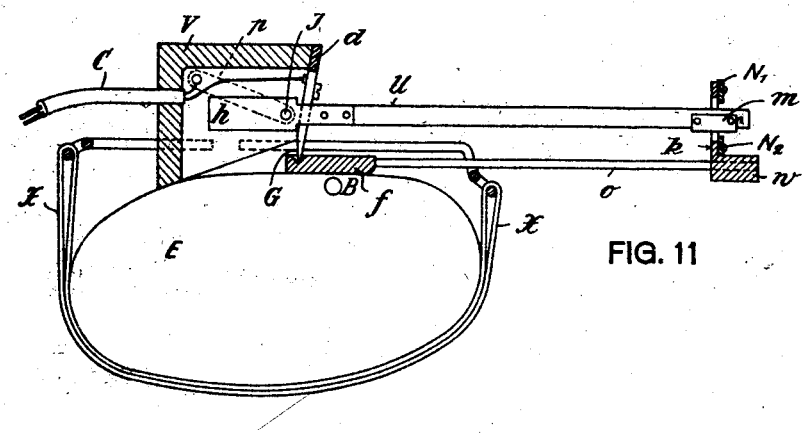
FIG. 11
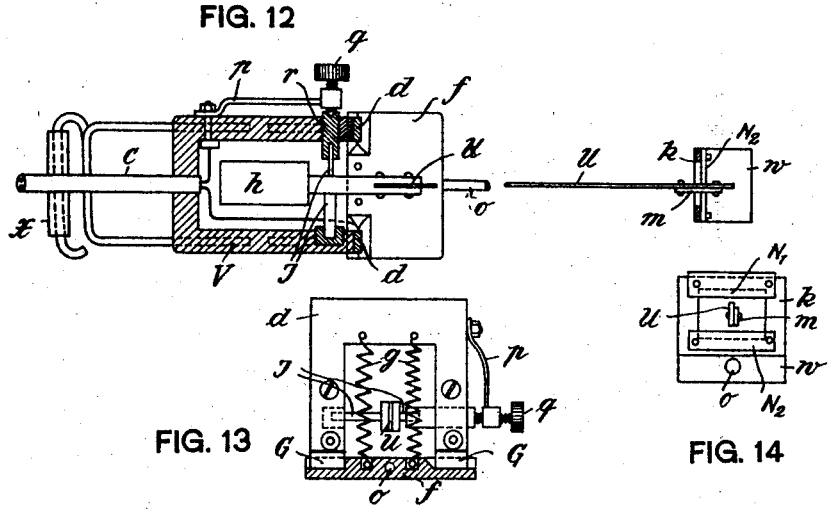
FIG. 12
FIG. 13
FIG. 14

Patented July 3, 1928.

1,675,800

UNITED STATES PATENT OFFICE.

RUDOLF GOLDSCHMIDT, OF CHARLOTTENBURG, BERLIN, GERMANY.

MECHANISM FOR MEASURING THE FREQUENCY OF THE PULSE.

Application filed September 8, 1926, Serial No. 134,304, and in Germany July 29, 1926.

This invention relates to mechanism for measuring low frequencies, especially the frequency of the pulse, referring more particularly to improvements of the mechanism as specified in my patent application No. 79,880.

In that patent application a mechanism has been described consisting essentially of iron pendulums suspended in the field of an electro-magnet, these pendulums being brought into motion by making and breaking the exciting current of said electro-magnet by means of the action of the pulse. The pendulums being tuned to different frequencies, the one which is in resonance with the pulse, will oscillate more than the others.

In consequence of the large amount of damping required in these pendulums, the tuning cannot be very sharp and the neighboring pendulums will also oscillate to a considerable degree. As pointed out in above named patent application this circumstance would make it very difficult to take an exact reading of the pulse except for the change of phase by about 180 degrees at the point of resonance.

According to the present invention the electro-magnetic field is given such a form that the pendulums tuned to the frequency above the resonance point stand still or vibrate slightly only, while the pendulums below this point are in oscillation. By these means not only a more exact reading of the instrument is possible, but the readings can also be registered automatically.

According to this invention the registering is done by placing opposite to each pendulum contacts at such a distance that only the pendulums in the most violent state of oscillation reach their contacts, most particularly the pendulum in resonance with the pulse. Through the making of this contact a circuit containing an electric battery or other source of electricity is closed and the ensuing electric current is used to draw by electro-chemical or mechanical means a line on a ribbon of paper or similar material. The frequency of the pulse and its fluctuations can be read from these lines.

Another object of this invention is to improve the make and break arrangement attachable to the wrist, a more primitive form of which has been described in my patent application No. 79,880.

In order that the invention may be more clearly understood reference is hereinafter made to the accompanying drawings whereon:—

Fig. 1 is a diagrammatic view of the arrangement which shows one of the 24 pendulums used in the apparatus and the electric circuit which is closed by the pendulum touching a contact placed opposite to it.

Figs. 2 and 3 are drawings of the particular shape of poleshoes as used in the electromagnet for actuating the pendulums.

Fig. 4 is a diagram of the intensity of the magnetic field of the electro-magnet.

Fig. 5 is a curve showing the amount of deflection during the oscillation of the different pendulums when actuated by the frequency of the pulse this curve having a shape which is attained according to the known art.

Fig. 6 is the corresponding curve according to the new art as used in this invention.

Figs. 7, 8 and 9 are sections and views of the complete apparatus.

Figure 8:
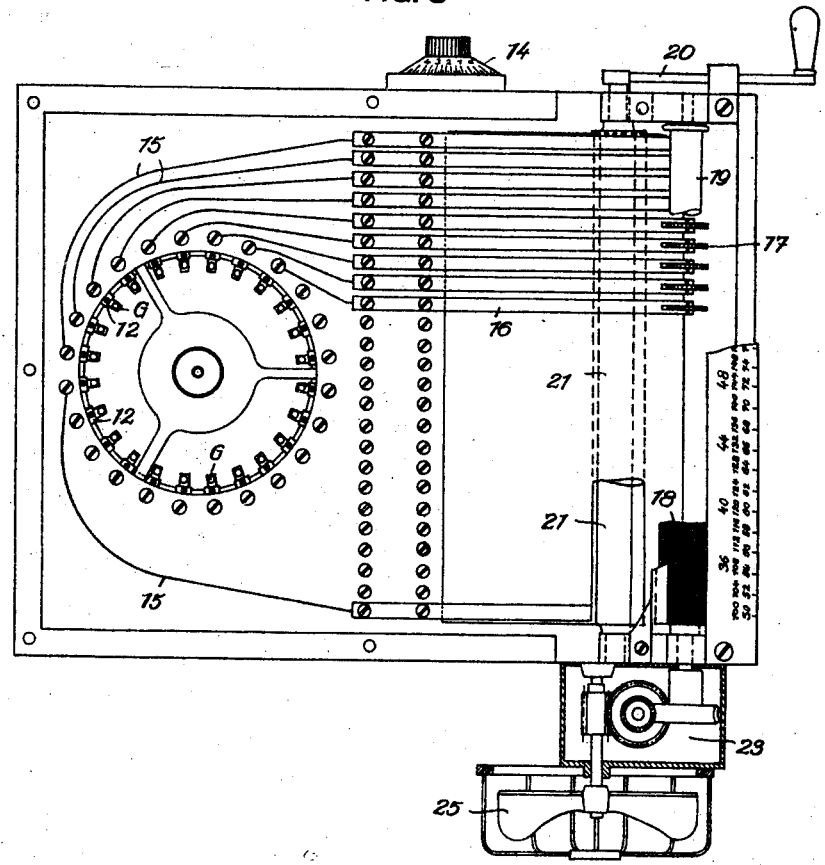

Figs. 11, 12, 13, and 14 are views of the make and break arrangement as actuated by the pulse and attached to the wrist by means of a wrist band.

Fig. 15 is a view of a similar apparatus attached to the wrist by means of a screw arrangement which allows careful adjustment.

In the schematical drawing Fig. 1: W is the iron-core of the electro-magnet with the pole-shoes L and Q and the coil S. This coil receives its exciting current from the battery E. The interruption of the electric circuit through the pulse is done by means of a contact F of the kind as already described in my patent application No. 79,880, and again dealt with below. The pendulums G are suspended round the edge of the pole-shoe L.

The two pole-shoes L and Q have a special shape. The circumference of L has spiral form as shown in Fig. 2 so that the distance of the pendulums G from the edge of this pole changes, preferably so that the pendulums tuned to the lowest frequencies have the greatest distance from the edge of the pole-shoe and consequently receive the smallest amount of magnetism.

The other pole-shoe Q is star shaped as shown by Fig. 3 and the pendulums are preferably placed in the intervals between the rays.

By such shape of the pole-shoes and by proper dimension of the distance of the pendulums from the pole-shoes, from the coil S and from the magnet core W the result is achieved that the pendulums move in a very asymetric magnetic field. The magnetic power of attraction increases steeply, when the pendulums swing in the direction towards the magnet. The curve Fig. 4 gives the intensity of the magnetic field J as dependent on the deflection of the pendulum. Due to the fact that there is a phase displacement of approximately 180 degrees in the motion of the pendulums above and below the resonance point, the closing of the exciting current takes place when the pendulums below the resonance point are in the region of the strong field near the magnet, while the pendulums above the resonance point obtain their impulse when they are in a weak field comparatively far away from the electro-magnet. Consequently the pendulums below the resonance point are most strongly energized and set up a larger oscillation.

Drawing a curve for the amount of deflection of the different pendulums when actuated with frequency 80, dependent on the number of the pendulums, which are designated by small circles, Fig. 6 is obtained, the pendulums below the resonance point R being most favored. For the sake of comparison Fig. 5 has been drawn as a symmetrical resonance curve as produced if the field curve has not the steep form as shown in Fig. 4.

This new form of resonance phenomenon enables the exact reading of the instrument as well as the registering. The pole-shoes L and Q need naturally not have the exact shape of Figs. 2 and 3, as it is only essential that a steep field curve (Fig. 4) is obtained. Instead of the star shape of the pole-shoe Q it might for instance take the shape of a disc with holes.

The method for registering the pulse consists of providing means for making the pendulums, which are in strong motion draw a line on a ribbon of paper or textile, whilst the pendulums which are in comparatively small oscillatory or vibratory movement only do not produce such lines.

The means for obtaining such results are extremely varied. I will only mention the use of pencils and pen and ink, the pendulums may draw such lines directly on the ribbon or a contact may be closed, by which an electric circuit is made and the current used for actuating an electro-magnet, the latter drawing the lines on the paper by means of ink, or the current may be used directly for drawing these lines by electro-chemical effect, or for burning the lines into the paper.

Figure 9:
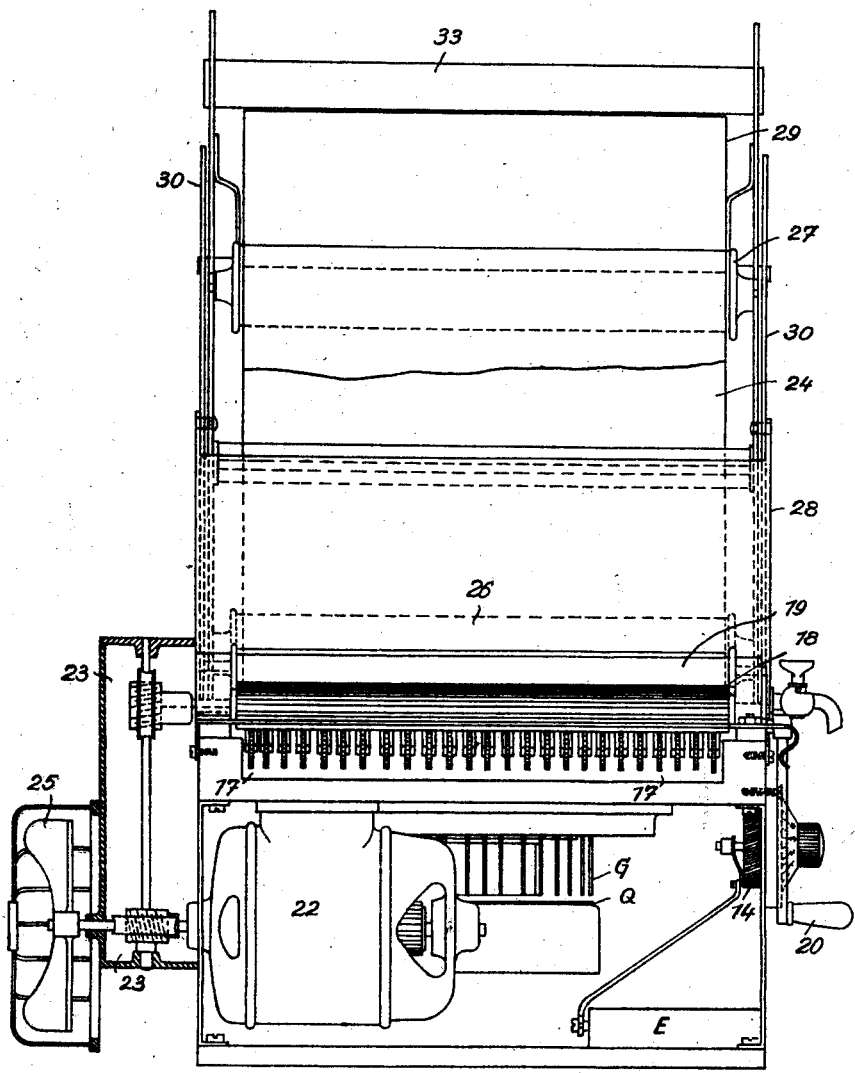

A construction where the electro-chemical method is used, is shown, schematically in Fig. 1, and more explicitly in Figs. 7, 8 and 9. In these figures: G is one of the pendulums. Opposite to each pendulum G is suspended on the pivot 11, a small lever 10. The centre of gravity of these levers is on one side of the pivots 11, so that they stand under a turning momentum tending to make them approach the pendulums G and are only prevented from such movement by abutments 12. Abutment 12, in the example shown as a screw, is adjustable and serves to regulate the distance 13 between the pendulum G and the end of the lever 10. As soon as the oscillation of a pendulum G has grown sufficiently large, it touches the lever 11. At the points of contact, 13, the parts are covered with platinum.

The contact need not take place between G and 10 directly. The abutment 12 may be insulated from the suspension pivot 11. With this arrangement as soon as a pendulum G pushes the corresponding lever 10, the latter is lifted from the abutment 12 by which action a circuit may be interrupted instead of closing a circuit by G and 10 touching one another.

The number of the pendulums G and therefore also the number of the contact levers 10 is preferably 24, each pendulum being used for measuring more than one frequency corresponding to the following steps of pulse frequencies:

| Pendulum number. | Tuned to frequency. | Responds also to frequency. |
| --- | --- | --- |
| 1 | 100 | 50 and 33⅓ |
| 2 | 104 | 52 and 34⅔ |
| 3 | 108 | 54 and 36 |
| 4 | 112 | 56 and 37⅓ |
| 5 | 116 | 58 and 38⅔ |
| 6 | 120 | 60 and 40 |
| 7 | 124 | 62 and 41⅓ |
| 8 | 128 | 64 and 42⅔ |
| 9 | 132 | 66 and 44 |
| 10 | 136 | 68 and 45⅓ |
| 11 | 140 | 70 and 46⅔ |
| 12 | 144 | 72 and 48 |
| 13 | 148 | 74 and 49⅓ |
| 14 | 152 | 76 and 50⅔ |
| 15 | 156 | 78 and 52 |
| 16 | 160 | 80 and 53⅓ |
| 17 | 164 | 82 and 54⅔ |
| 18 | 168 | 84 and 56 |
| 19 | 172 | 86 and 57⅓ |
| 20 | 176 | 88 and 58⅔ |
| 21 | 180 | 90 and 60 |
| 22 | 184 | 92 and 61⅓ |
| 23 | 188 | 94 and 62⅔ |
| 24 | 192 | 96 and 64 |

If for instance the pulse frequency is 80 (Fig. 6) then the pendulums Nr. 16, Nr. 15, down to about Nr. 13 will reach their corresponding levers 10, while this is not so with the pendulum Nr. 17 and above. By means of a variable resistance (14 in Figs. 7–9) the excitation of the coil S can be regulated and consequently also the number of the active pendulums tracing lines on the paper.

The abutments 12 or the suspensions 11 are connected with twenty-four springs (16) by means of the leads 15. These springs 16 carry at their ends round discs (17) in pivots and press these discs 17 against a broad roller 18, which reaches over all twenty-four discs, which are the electrodes. The roller 18 as well as the discs 17 are preferably fluted on their circumference, the fluting or knurling of the discs 17 being deeper than that of the roller 18.

19 is a second roller, cooperating with 18 for the paper transport. These two rollers are pressed one against the other by the springs 16 which necessitates that the bearings of 18 have amply play. In order to make the introduction of the paper ribbon easy the springs 16 together with the discs 17 can be pressed downward by means of a lever 20 and the excentric 21, so that the rollers are relieved from pressure. The roller 18 is partly surrounded by a stationary guide 52 for the paper, which is useful when the latter is inserted between the rollers.

The roller 18 is driven by clockwork or a little motor 22, on account of the slow speed of the roller by means of a double worm gear 23, the paper moving with a speed of about 8 inches per minute. The fan 25 serves to keep the speed of the motor and consequently of the paper constant within practical limits.

The paper ribbon 24 is dipped in a tank 28 filled with liquid (salt-water), by means of the rollers 26 and 27, so that it passes between the discs 17 and the roller 18 in a well moistened condition. The rollers 26 and 27 as well as the roll of paper 29 have their bearings in a frame 30, so that they can be lifted together out of the liquid in tank 28. To keep the frame 30 in the upper position for inspection or inserting paper, buttons 31 fixed on frame 30, are made to rest in grooves 32 of supports attached to tank 28. 33 is a weight pressing upon the roll of paper 29 and acting as brake. The knife edges 34 squeeze superfluous moisture out of the wet paper after leaving the liquid.

The paper 24 is preferably newspaper-printing paper, or some other hygroscopic paper. It is soaked or covered on one or both sides with litmus, phenol-phtaleine, alizarine, or a similar chemical dye. 35 in Figs. 1 and 7 is a push plug connected to a source of electricity which, as soon as one of the pendulums G comes into contact with the corresponding lever 10, sends a current via this contact, suspension 11, lead 15, through one of the springs 16, electrode disc 17, and through the moist paper to the roller 18 and back over an incandescent lamp or some other electrical resistance 36, which is connected with the second pole of 35. Consequently the discs 17 serve two purposes: they assist to move the paper and to lead the electric current through the moist paper as electrodes. The electric current decomposes the salt-water in the paper so that the chemical changes its color where the discs touch and consequently a line is drawn on the paper as long as the current flows, i. e. as long as the pendulums oscillate sufficiently to touch the opposite contact 10.

This method can be modified by using ordinary paper not treated with any chemicals and filling the tank 28 with the chemical die, for instance a litmus solution, thus soaking the paper with the latter shortly before it is used for writing the record.

Figure 10:
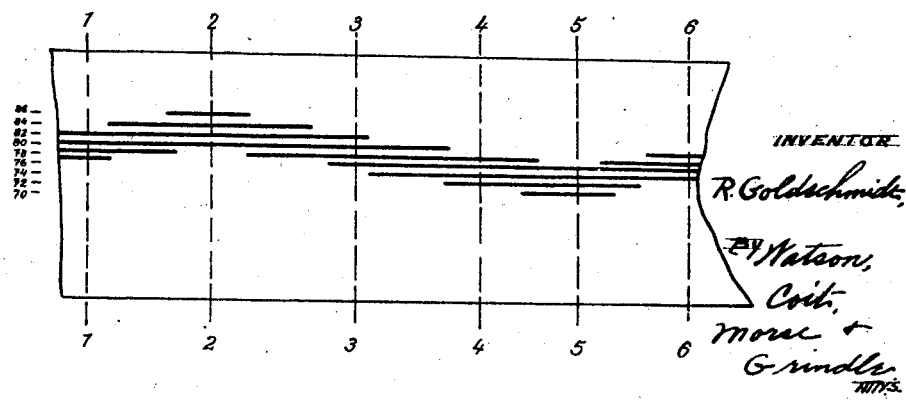
Fig. 10 is a diagram of pulse lines as obtained by such instrument.

Fig. 10 is a view of the paper ribbon with the pulse record. Bearing in mind that every oscillating pendulum G, coming into contact with the corresponding lever 10, draws a line on the paper, it is understood that the upper lines denote the pulse. Referring to Fig. 10, the conditions at 6—6 correspond to the diagram of amplitudes Fig. 6, for 80 cycles per minutes.

At 1—1 the frequency is 82 per minute
At 2—2 the frequency is 86 per minute
At 3—3 the frequency is 82 per minute
At 4—4 the frequency is 78 per minute
At 5—5 the frequency is 76 per minute
At 6—6 the frequency is 80 per minute Figs. 11, 12, 13, and 14 are drawings of the contact maker as attached to the wrist. V is a frame consisting preferably of insulating material, fibre, hard rubber or the like and is attached to the wrist E by means of wire hooks and ribbons X. These ribbons may be rubber bands or a textile material strapped to the wrist or slipped over the hand. At B where the pulse is most noticeable rests the plate $f$, which is pivoted on knife edges G and held in position by the springs $g$. The knife edges G are attached to the frame V. Under the pressure of the pulse the plate $f$ swings up and down, this movement being enlarged by a lever $o$ fixed on $f$, on the outer end of $o$ a little weight $w$ being attached as a fly-weight for storing the energy of the pulse. This weight may be counterbalanced by a weight attached to a lever on the opposite side of G, so that the whole swinging system is pivoted and suspended in its centre of gravity. A second lever U is pivoted at J by a counter-weight $h$ so that the second lever, U, is also suspended as near as possible in its centre of gravity. The lever $o$ may be called the primary one. On $w$ is attached a little window $k$, the upper edge of which $N_1$ is insulated consisting for instance of a piece of celluloid, whilst the lower edge of the window consists of a piece of platinum $N_2$. The lever U may be called the secondary lever. It penetrates through the window $k$ with an extremely small clearance, say .003". On the lower side of U opposite to the platinum edge $N_2$ is attached the piece of platinum $m$. When the primary lever $o$ moves upward, these two platinum edges come into contact. If the primary lever $o$ moves downward, the insulated upper edge $N_1$ of the window $k$ touches the lever U and the electric connection between $o$ and U is interrupted.

In order to produce a reliable contact between the primary and secondary levers the movement of the latter must not be free but ought to be damped to a certain degree. This is done by a braking arrangement, causing friction in the bearings of U. The blade spring $p$ carries the screw $q$, the latter pressing in axial direction upon the bearing $r$ of the pivots J. The friction in the bearings of J can be regulated by turning the small screw $q$. For the purpose of finding the pulse by observing the movement of the levers $o$ and U, it is advisable to turn $q$ at first quite loose, and to tighten it afterwards in such a way that the movement of $o$ and U is damped to about half, what corresponds approximately to the most favorable damping conditions.

In Fig. 15 the same arrangement is shown with a slightly different wrist attachment. The latter consists here of a screw-clamp 37 in which rests the wrist 45. The hoop 39 is adjustable relative to the screw-clamp 37 by means of a slot and screw and nut 38. Frame 44 with its lever and contact arrangements 46, 47, 48, and 49 is fixed to a double spring 42—43, and the latter is attached to the hoop 39 by means of the screws 40 and 41. By screwing down 40 and 41 the contact making apparatus is pressed against the wrist, the pressure exercised by the double spring 42—43 on the frame 44 or the pulse plate 46 being adjustable by means of the screws 40 and 41.

Claims:

1. Mechanism for measuring and recording low frequencies especially the frequency of the pulse consisting essentially of a series of pendulums containing iron and suspended in the vicinity of a wire bobbin, this bobbin being connected to the source of the low frequency current, the bobbin containing an iron core having pole-shoes, the magnetic field being arranged thus, that the pendulums tuned to frequencies above the resonance point oscillate in a smaller degree than those tuned to frequencies below the resonance point.

2. Mechanism for measuring and recording low frequencies especially the frequency of the pulse consisting essentially of a series of pendulums containing iron and suspended in the vicinity of a wire bobbin, this bobbin being connected to the source of the low frequency current, contacts being placed opposite to the pendulums in such a distance, that the pendulums in most violent oscillation come into touch with these contacts.

3. Mechanism for measuring and recording low frequencies especially the frequency of the pulse consisting essentially of a series of pendulums containing iron and suspended in the vicinity of a wire bobbin, this bobbin being connected to the source of the low frequency current, contacts being placed opposite to the pendulums in such a distance that the pendulums in most violent oscillation come into touch with these contacts, a ribbon of paper or similar fabric, means for moving said ribbon and means for registering on said ribbon the change of electric currents as changed or caused to flow by the pendulums touching the opposite contacts.

4. Mechanism for measuring and recording low frequencies especially the frequency of the pulse consisting essentially of a series of pendulums containing iron and suspended in the vicinity of a wire bobbin, this bobbin being connected to the source of the low frequency current, contacts being placed opposite to the pendulums in such a distance that the pendulums in most violent oscillation come into touch with these contacts, a ribbon of paper or similar fabric, means for moving said ribbon, means for moistening said ribbon, means for conducting through the moist ribbon a current changed or caused to flow by a pendulum touching the opposite contact, chemicals being contained in said ribbon of paper, altering its color under the influence of an electric current.

5. Mechanism for measuring and recording low frequencies especially the frequency of the pulse consisting essentially of a series of pendulums containing iron and suspended in the vicinity of a wire bobbin, this bobbin being connected to the source of the low frequency current, contacts being placed opposite to the pendulums in such a distance that the pendulums in most violent oscillation come into touch with these contacts, a ribbon of paper or similar fabric, means for moving said ribbon, means for moistening said ribbon, electrodes for conducting through the moist ribbon a current changed or caused to flow by a pendulum touching the opposite contact, these electrodes consisting of pivoted discs the number of which is equal to the number of pendulums the movement of which is to be recorded.

6. A mechanism as claimed in claim 2, the contacts opposite the pendulums consisting of pivoted levers.

7. A mechanism as claimed in claim 2, the contacts opposite the pendulums consisting of pivoted levers, the latter being adjustable with regard to their distance from the pendulums.

8. The combination with a circuit maker and breaker adapted to be operated by the pulse in the wrist, of a hoop supporting said maker and breaker, means to attach said hoop to the wrist, and means to adjust said maker and breaker in respect to the wrist and the hoop.

In testimony whereof I affix my signature.

RUDOLF GOLDSCHMIDT.